United States Patent
El Waffaoui et al.

(10) Patent No.: US 8,730,016 B2
(45) Date of Patent: May 20, 2014

(54) NON-CONTACT COMMUNICATION DEVICE AND METHOD OF OPERATING THE SAME

(75) Inventors: Rachid El Waffaoui, Eindhoven (NL); Giuliano Manzi, Graz (AT)

(73) Assignee: NXP B.V., Eindhoven (NL)

( * ) Notice: Subject to any disclaimer, the term of this patent is extended or adjusted under 35 U.S.C. 154(b) by 193 days.

(21) Appl. No.: 13/082,999

(22) Filed: Apr. 8, 2011

(65) Prior Publication Data

US 2011/0248832 A1    Oct. 13, 2011

(30) Foreign Application Priority Data

Apr. 8, 2010   (EP) ..................................... 10159383

(51) Int. Cl.
*H04Q 9/00* (2006.01)
(52) U.S. Cl.
USPC ......................................................... 340/10.5
(58) Field of Classification Search
USPC .................................. 340/10.5, 12.51, 13.26
See application file for complete search history.

(56) References Cited

U.S. PATENT DOCUMENTS

| | | | |
|---|---|---|---|
| 5,263,183 A * | 11/1993 | Owen .......................... | 455/193.1 |
| 6,055,420 A | 4/2000 | Veranth | |
| 7,107,026 B2 * | 9/2006 | Pinks ............................ | 455/123 |
| 7,167,090 B1 | 1/2007 | Mandal et al. | |
| 7,595,732 B2 * | 9/2009 | Shameli et al. ............ | 340/572.5 |
| 2008/0136500 A1 * | 6/2008 | Frulio et al. ................... | 327/536 |
| 2011/0080152 A1 * | 4/2011 | Luzzi et al. .................... | 323/299 |

OTHER PUBLICATIONS

Chakraborty, B. and Pal, R.R. "Design of a Phase Detector with Improved Performance." Journal of Physical Sciences, vol. 12, 2008, 213-220.*
Extended European Search Report for European Patent Appln. No. 10159383.8 (Jul. 26, 2010).
U.S. Appl. No. 12/650,698, filed Dec. 31, 2009, Waffaoui.

* cited by examiner

*Primary Examiner* — Brian Zimmerman
*Assistant Examiner* — Thomas McCormack

(57) ABSTRACT

A non-contact communication device is disclosed comprising: an antenna having an input impedance and being for receiving an AC signal having a voltage and a current, a main unit comprising a power-extraction unit and a communication unit and having a main unit impedance, a tuning circuit, and a matching network for matching the input impedance to the main unit impedance, characterized in that the tuning circuit comprises a phase detector for detecting a phase difference between the voltage and the current and is configured to adjust the impedance of the matching network in dependence on the phase difference. Also disclosed is a method for tuning a non-contact communication device.

19 Claims, 8 Drawing Sheets

NON-CONTACT COMMUNICATION DEVICE AND METHOD OF OPERATING THE SAME

CROSS-REFERENCE TO RELATED APPLICATIONS

This application claims the priority under 35 U.S.C. §119 of European patent application no. 10159383.8, filed on Apr. 8, 2010, the contents of which are incorporated by reference herein.

FIELD OF THE INVENTION

This invention relates to non-contact communication devices, and to methods of operating non-contact communication devices.

BACKGROUND OF THE INVENTION

Non-contact communication devices are widely used in a range of applications, such as stock control and inventory management, item tracking, security, and the like. Since a basic function of non-contact communication devices is identification of the device or tag, and radio frequencies are used, this technology is also known as RFID (radio frequency identification devices), although should be noted that applications now considerably extend beyond mere simple identification function. Hereinbelow, non-contact communication and RFID shall be used synonymously.

RFID generally has two main components: a device, which may be, for instance, in the form of a tag, or embedded in a card, chip, or other item, and a reader. Hereinbelow, the term tag will be used to indicate any configuration of the device. In a typical arrangement, the reader transmits a RF AC signal at a frequency which may typically be in the range of 125-148.5 kHz (low frequency—LF), around 13.56 MHz (high frequency—HF), or between 300 MHz and 3 GHz (ultrahigh frequency—UHF). The exact frequency ranges used depend on the regulatory requirements of the country or region for which the reader and tags are designed. The tag typically modulates the RF signal, and retransmits or backscatters it back to the reader. The reader detects the return modulated signal, and demodulates it in order to extract information from the tag. In more advanced non-contact communication devices, the reader may provide information to the tag within the RF signal, and the tag may process or store this information and may provide a response thereto.

Tags may be either passive, or active. An active tag has its own power supply, to power for instance the modulation circuitry. However, providing an on-board power supply is relatively expensive and they are relatively bulky: therefore, passive tags are more widely used. Passive tags do not have their own power supply, but rather extract power from an external source, which is most typically the RF field. Although this invention relates primarily to passive tags, it may also find application in active tags, for instance to avoid or reduce Bit Error Rate (BER) losses under detuned conditions.

Passive tags, and in particular passive UHF tags, generally have a higher "read range"—that is to say, the distance between tag and reader over which the tag can communicate—than other tags. However, for all tags, and passive tags in particular, the read range can be affected by environmental factors, which may detune the tag, thus modifying its operating frequency and potentially reducing the received power.

An RFID tag's performance, assuming constant power consumption in its integrated circuit (IC), depends on the amount of power that can be captured by the antenna and provided to the IC. This in turn depends on impedance matching between the antenna and the IC. Environmental factors such as the presence of metals, liquids or other materials, or the close proximity of further tags, may lead to absorption or parasitic capacitance, which can the result in detuning the tag. Detuning of the tag may also result from the process spread in manufacturing of, for instance, any of the chip, antenna or packaging.

It has been proposed in U.S. Pat. No. 7,167,090 to provide a feedback tuning circuit, to mitigate the problem of detuning. The tuning circuit alters the impedance of the impedance matching network coupling the antenna to rest of the device, in order to maximise the RF input signal and thereby optimise the performance of a power extraction circuit.

However, such a circuit is sensitive to noise on the amplitude modulation (AM) signal, variation in transmitter power, and changes in the surrounding environment of the tag.

SUMMARY OF THE INVENTION

It is an object of the present invention to provide an alternative non-contact communication device which can be tuned.

According to a first aspect of the present invention, there is provided a non-contact communication device comprising: an antenna having an antenna impedance and being for receiving an AC signal having a voltage and a current, a main unit comprising a power-extraction unit and a communication unit and having a main unit impedance, a tuning circuit, and a matching network for matching the antenna impedance to the main unit impedance, characterised in that the tuning circuit comprises a phase detector for detecting a phase difference between the voltage and the current and is configured to adjust the impedance of the matching network in dependence on the phase difference.

Use of a phase detector results in a device which is less sensitive to amplitude modulated noise than known devices, since noise tends to have a more significant impact on the amplitude than the phase of the input RF signal.

In embodiments, the matching network comprises a capacitor bank for providing a selectable capacitance and the tuning circuit is configured to adjust the impedance of the matching network so as to minimise the quadrature phase error, by selecting the capacitance of the matching network. By quadrature phase error, is meant the amount by which the phases are not in quadrature. For instance, if the first phase leads the second phase by a phase difference of $\pi/3$, then the out-of-quadrature phase difference is $\pi/6$, being the difference between $\pi/3$ and a quadrature phase of $\pi/2$. The quadrature phase error may also be termed out-of-quadrature phase difference.

In embodiments the phase detector is a passive phase detector. A passive phase detector does not require the relatively high level of energy typically required by active phase detectors. For active tags this energy may be available, but is unlikely to be available to passive tags, in which the use of a passive phase detector thus may provide a significant advantage.

In embodiments, the phase detector detects a phase difference between the input voltage and the input current by detecting the phase difference between the input voltage and a coil voltage across a matching coil (L8), which matching coil forms part of the antenna (22)

In embodiments, the power-extraction unit comprises a first output for providing power to the tuning circuit and a second output for providing power to the communication unit. Thereby, the tuning can operate to match the impedance, under badly detuned conditions, or other conditions where there is not sufficient power available to operate the complete tag.

In embodiments, the power extraction unit is an RF-to-DC converter and may in particular be a charge pump.

In embodiments, the first power output has at least one of more stages and a smaller time constant than the second power output. Using more stages for the first output helps to build quickly sufficient voltage under detuning conditions. A smaller time constant helps to speedup the tuning process. Faster response is thereby facilitated, which is beneficial, since a tag should be able to respond to the reader command within a given amount of time.

In embodiments, the tuning circuit further comprises a quantiser for quantising the output of the phase detectors and for providing an input to a counter, which counter is configured to select the capacitance of the matching network.

According to another aspect of the present invention, there is provided a method of operating a non-contact communication device, the method comprising: receiving an AC signal at an antenna; extracting power from the AC signal; using at least a part of the extracted power to tune the device by: detecting a phase difference between a voltage and a current of the AC signal in a phase detector, and adjusting a matching network in dependence on the phase.

In embodiments, adjusting the matching network in dependence on the phase comprises quantising an output of the phase detector, adjusting a counter in response to the quantisation, and selecting the capacitance of a capacitor bank in dependence on the counter.

In embodiments, the method may further comprise, subsequent to tuning the device, using a further part of the extracted power to power a communication unit.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1A:
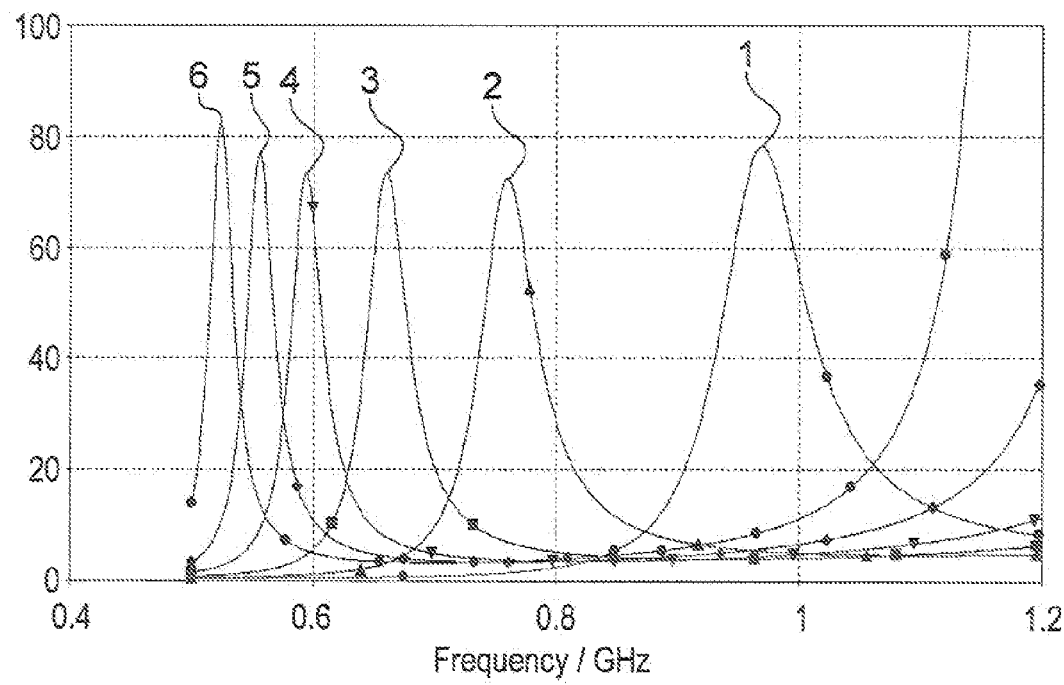
FIG. 1(a) is a graph showing the real part of an antenna's impedance, under simulations in which the permittivity $\epsilon r$ of the surrounding material is varied between 1 and 10.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

FIG. 1(a) is a graph showing the real part of an antenna's impedance, under simulations in which the relative permittivity $\epsilon r$ of the surrounding material is varied between 1 and 10. Plotted on a relative scale against frequency, is the imaginary part 1 of the antenna impedance, tuned to a frequency of around about 960 MHz, surrounded by air or another medium having a relative permittivity $\epsilon r$ equal to unity. Also shown on the graph are plots 2-6 of the impedances of the same antenna, when surrounded by a medium having relative permittivity value $\epsilon r$ of 2.8, 4.6, 6.4, 8.2, and 10 respectively. From the graph it is clear that although the magnitude of the peak in the impedance does not vary significantly, the frequency at which the peak occurs, that is to say the tuned frequency of the antenna, reduces from the value around 960 MHz, in the case 1 where the relative permittivity $\epsilon r$ is unity, to about 500 MHz for plot 6 in which the relative permittivity $\epsilon r$ is 10. Thus a change in relative permittivity has a significant impact on the tuned frequency of the antenna.

Thus, a small change in a relative permittivity $\epsilon r$ could cause a tag to fail to receive a wake-up signal from a transmitter or reader.

Figure 1B:
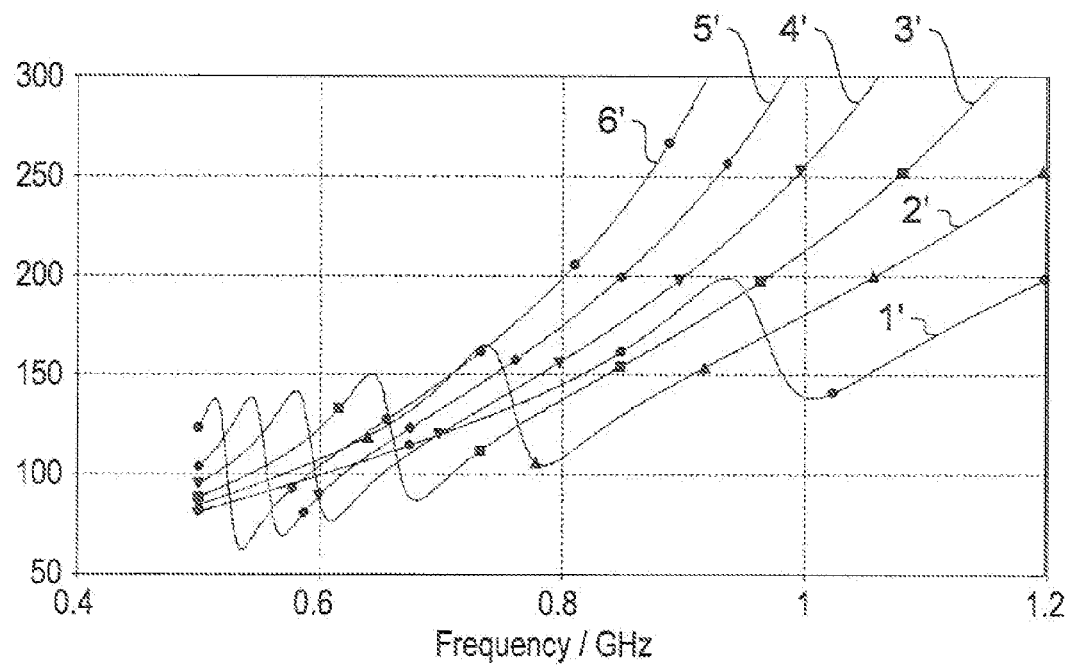
FIG. 1(b) is a graph showing the imaginary part of an antenna's impedance under the same simulated conditions.

For completeness, shown at FIG. 1(b) is a graph showing the imaginary part of an antenna's impedance under the same simulated conditions. It is noted that the real part of the charge pump impedance can be adjusted by tuning the conduction angle of the rectifiers to the antenna. Such a tuning method is described in the current Applicant's co-pending but not pre-published U.S. patent application Ser. No. 12/650,698, the entire contents of which are incorporated herein by reference. The graph shows that the local maximum in the real part of the impedance occurs at reducing frequencies, again ranging from just under 1 GHz to around 500 MHz, as the relative permittivity $\epsilon r$ increases from unity to 10.

Figure 2:
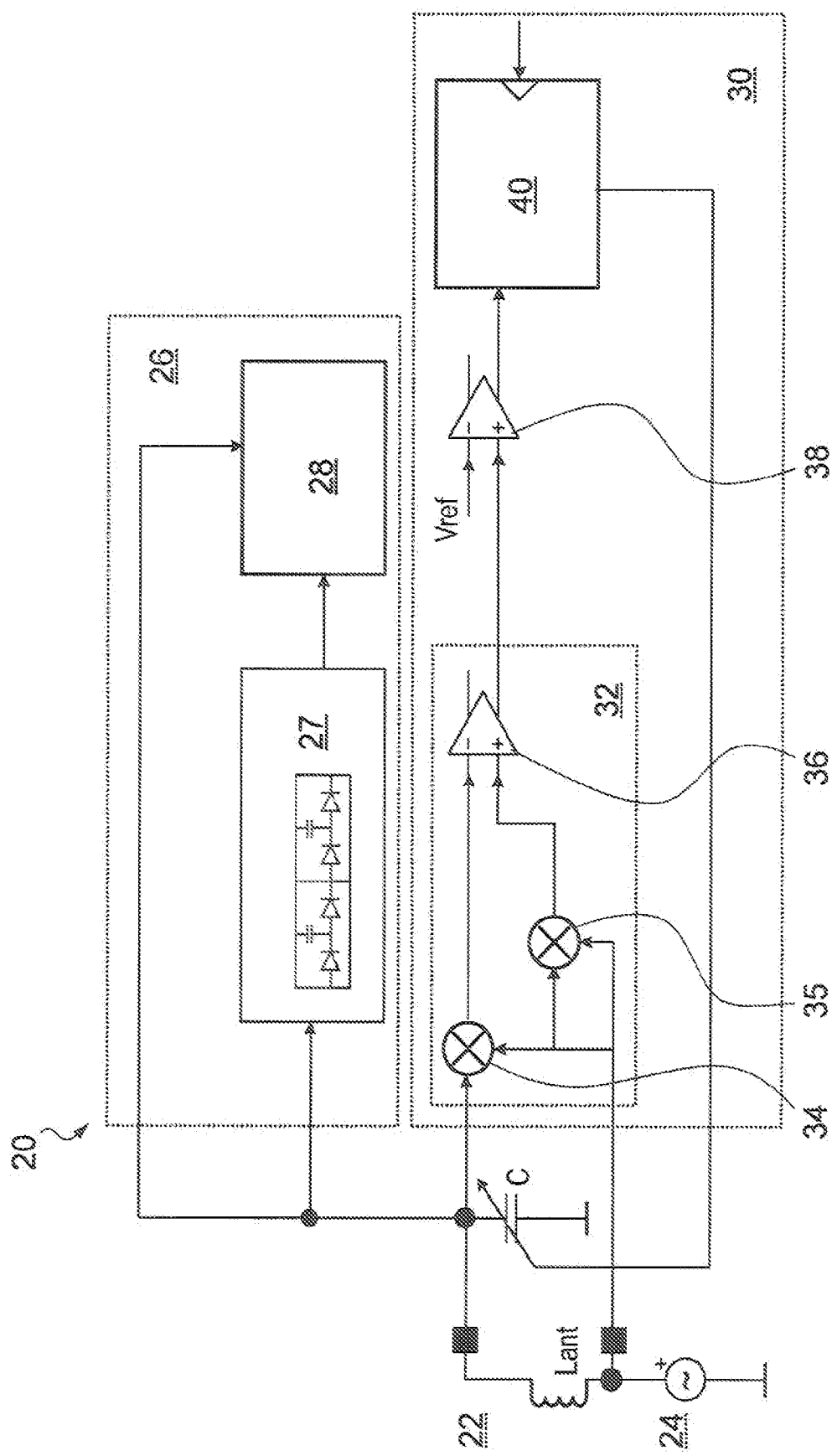
FIG. 2 shows a simplified schematic of a non-contact communication device according to embodiments of the invention.

FIG. 2 shows a simplified schematic of a non-contact communication device according to embodiments of the invention. Shown in the Figure is a non-contact communication device 20 comprising: an antenna 22 having a matching coil Lant and being for receiving an AC signal 24 having a voltage and a current, a main unit 26 comprising a power-extraction unit 27 and a communication unit 28 and having a main unit impedance, a tuning circuit 30 and a matching network for matching the antenna impedance to the main unit impedance. The tuning circuit comprises a phase detector 32 for detecting a phase difference between the voltage and the current and is configured to adjust the impedance of the matching network in dependence on the phase difference.

As shown in FIG. 2, the phase detector 32 comprises a passive mixer 34 which is connected across the antenna 22, and a second passive mixer 35, the inputs to which are both provided from one antenna connection. The passive mixers 34 and 35 provide a phase quadrature error signal to the differential amplifier 36. The output from differential amplifier 36 is routed to a quantiser comprising a comparator 38; the input is compared to a reference value Vref, and the output of the comparison is directed to a counter 40, to either increment or decrement the counter depending on the result of the comparison. The counter is used by a digital control block (not shown) to change the capacitance value of the capacitance C which is comprised in the matching network for the antenna 22. The power unit 27 contains a charge pump; the communication unit 28 typically comprises at least a part of the tag integrated circuit, which performs demodulation and modulation functions; in other devices the communication unit 28 may include storage capability, and may include processing capability in order to perform calculations or manipulate the modulated data transmitted by a reader (not shown), and to provide the results of the calculations or data manipulation.

Figure 3:
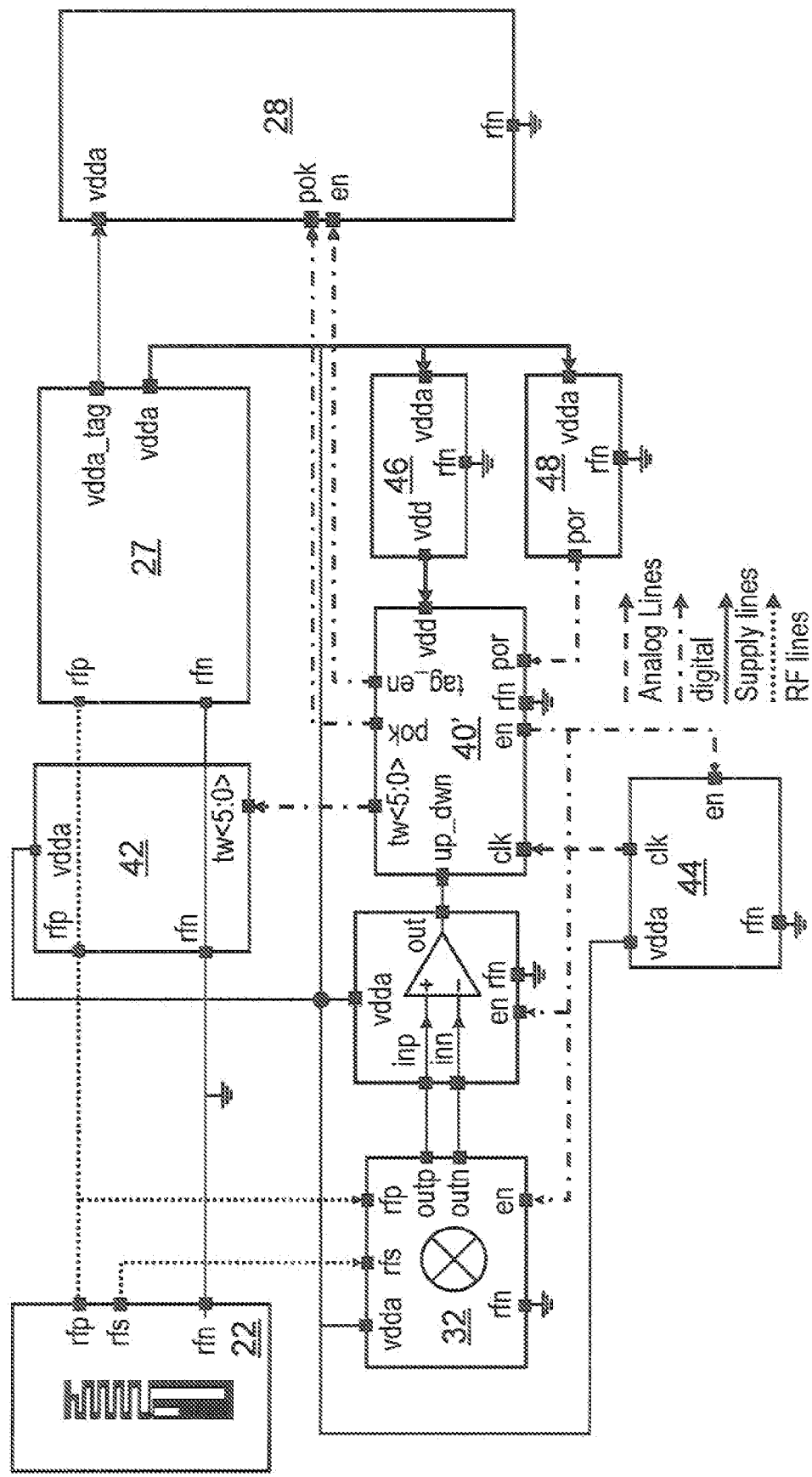
FIG. 3 shows a more detailed schematic of a non-contact communication device according to embodiments of the invention.

FIG. 3 shows a more detailed schematic of a non-contact communication device according to embodiments of the invention, and shows in addition to the detail of FIG. 2, the interconnections between components, comprising RF connections (shown dotted in FIG. 3), dc power supply connections (shown solid), digital data communication lines (shown dot-dashed), and analog data communication (shown dashed). Like blocks are assigned like reference numerals to FIG. 2: thus, antenna 22 has RF connection lines to the phase detector 32, and to the capacitor bank 42 which provides a selectable capacitance C and an RF-to-DC converter 27, which as shown may be a charge pump. Due to the design of the antenna, which will be described in more detail herebelow with reference to FIG. 4, the RF connections between the antenna and phase detector provide separate information on the voltage across the antenna and the current through it (shown as rfs and rfp). The phase detector 32 provides a phase quadrature error signal to the comparator 38. The comparator provides a digital signal to the digital counter and state machine 40', which analog signal indicates either an increment or decrement. The digital counter and state machine (which forms a digital control block), sends a signal to the capacitor bank 42, to adjust its capacitance value, either increasing or decreasing it, by selecting an appropriate combination of capacitors, some or all of which may be switched in or out of capacitance C. As shown, the digital signal to the capacitor is a 6-bit word, so the capacitance can be selected to any one of $2^6$ values (that is to say, to any one of 64 values); however, in other embodiments, shorter or longer word lengths may be used, to provide greater or lesser resolution for the impedance matching.

The timing of counter 40' is controlled by means of clock 44, which provides a clock signal (clk) to the counter. A supply regulator (LDO) 46 provides a stable digital supply to the digital circuits, while the power-on-reset (POR) 48 triggers the tuning process when the supply voltage at the first output of the charge pump 27 is higher than 1.0V Shown in FIG. 3, associated with some of the blocks or units, is a current value in nA. These values represent, for an example embodiment, the current requirement of each of the units. In particular, the phase detector may have a current requirement of 100 nA, comparator 38 may have a current requirement of 15 nA, the clock generator 44 may have a current requirement of 200 nA, the LDO 46 a requirement of 50 nA, and the POR 48 a requirement for 10 nA. These blocks or units may be required according to embodiments of the invention, but are not necessarily present in conventional devices. Thus the impedance-matching tuning by means of a phase detector according to embodiments of the invention may consume (100+50+200+50+10), that is to say, 410 nA. Embodiments of the invention include modifications to the power extraction unit 27, compared with those known in conventional devices, in order to ensure that, when the antenna is badly detuned from the RF field, resulting in a significant mismatch, the tuning circuitry can be provided with sufficient power in order to tune the antenna.

Figure 4A:
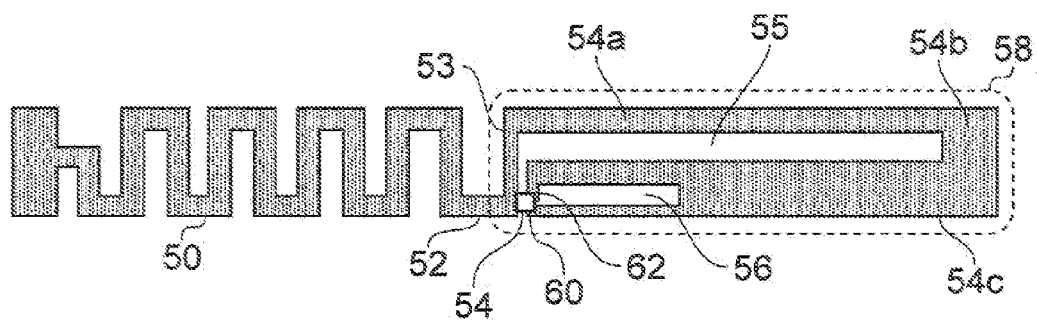
FIG. 4(a) shows an example geometrical arrangement of an antenna attached to a non-contact communication IC.
Figure 4B:
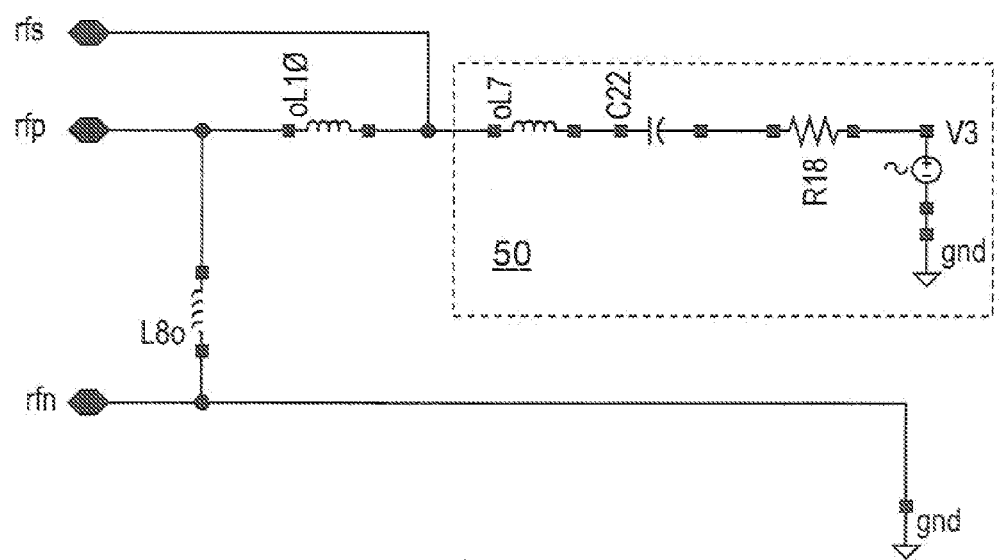
FIG. 4(b) shows the equivalent circuit of the configuration of FIG. 4(a)

FIG. 4(a) shows an example geometrical arrangement of an antenna attached to the non-contact communication IC, and FIG. 4(b) shows the equivalent circuit of the configuration of FIG. 4(a). The antenna comprises a combination of a dipole 50 and a matching network 58. The dipole is shown as a meander structure, but may assume other known geometries, as will be immediately apparent to the skilled person. The dipole 50 shown on the left side of the antenna is connected, by means of an arm 52, to a matching network 58. Two loop sections (or stubs) are implemented onto the matching network. A first loop section is an elongate loop having first arm 54a, end angle 54b and return arm 54c. Return arm 54c is partially split, by means of slot 56, so as to enable two separate connections to the IC 54.

In the FIG. 4(a), IC 54 is shown mounted on the matching network. The IC pin rfs is connected to the antenna via 52 and to the matching network via 53, the IC pin rfp is connected to the matching network at 62 and the rfn pin is connected at 60. The coil L10 depicted in FIG. 4(b) is part of the matching network 55, and is also used to sense the current flowing into the charge pump. The coils L8 and L10 (corresponding to 56 and 55 in FIG. 4a, respectively) are also helping to transform the capacitance of the front-end to a much smaller value compared to the capacitance of the antenna. This allows maximizing the tuning range of the resonance frequency of the RLC network.

Figure 5A:
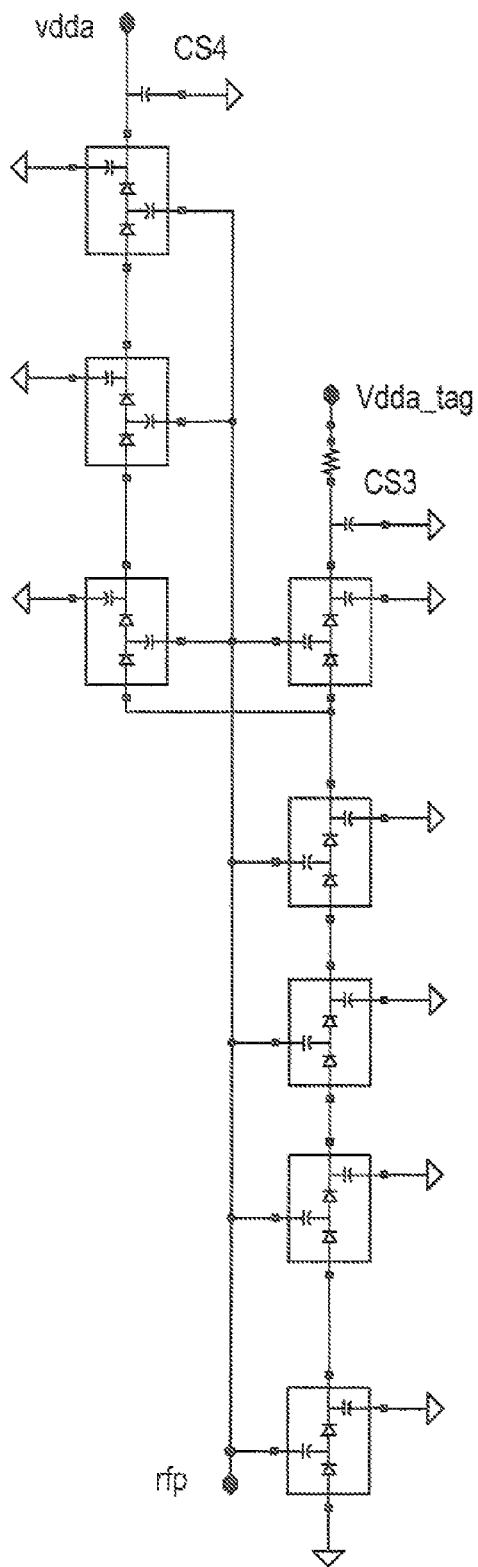
FIG. 5 shows the circuit diagram of an example charge pump.
Figure 5B:
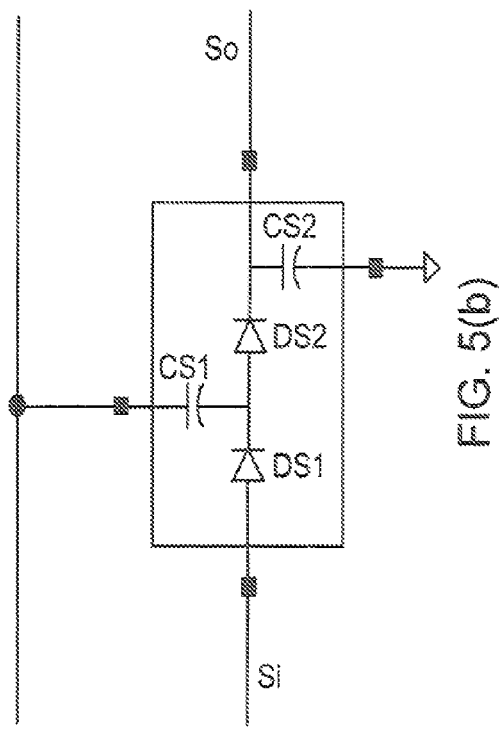

FIG. 5(a) shows the circuit diagram of an example charge pump, a detail of which is shown in enlarged in FIG. 5(b). The charge pump may be provided as the power extraction unit 27, in embodiments of the invention. The charge pump comprises a linked series of stages, one of which is shown in greater detail in FIG. 5(b). The stage comprises a series-connected pair of diodes DS1 and DS2 connected between the stage input Si and the stage output So. A first stage capacitor CS1 is connected between the node between the diodes and the input voltage rail rfp, and the second stage capacitor CS2 is connected between the output and the ground (or return) rail. Such a multistage charge pump will be familiar to the skilled person. However, the charge pump configuration of FIG. 5(a), as used in embodiments of the invention, includes a power unit (hereinafter referred to as the second power unit) consisting of a multistage charge pump, together with another power unit (hereinafter referred to as the first power unit) comprising a further multistage charge pump. In this specific embodiment shown, the second power unit has five stages, whereas the first power unit has three extra stages. Of course, in other embodiments, each power unit may have more or fewer stages. In the embodiment shown, the second power unit also has a longer time constant than first power unit due to a large storage capacitance CS3 connected at its output. The first power unit, having more stages, is able to extract power from a weaker received signal, sufficient to operate the tuning circuit according to embodiments of the invention. Once the matching circuit has been tuned, the second power unit can be made operable, to provide power to the rest of the tag, including the communication functions, and data storage and manipulation if the tag is desired for such. The charge pump may be configured as shown such that the second power unit does not provide any power to the tuning circuit or matching network; in other embodiments, the second power unit may be arranged so as to act as an auxiliary power source to the tuning circuit and matching network.

Figure 6:
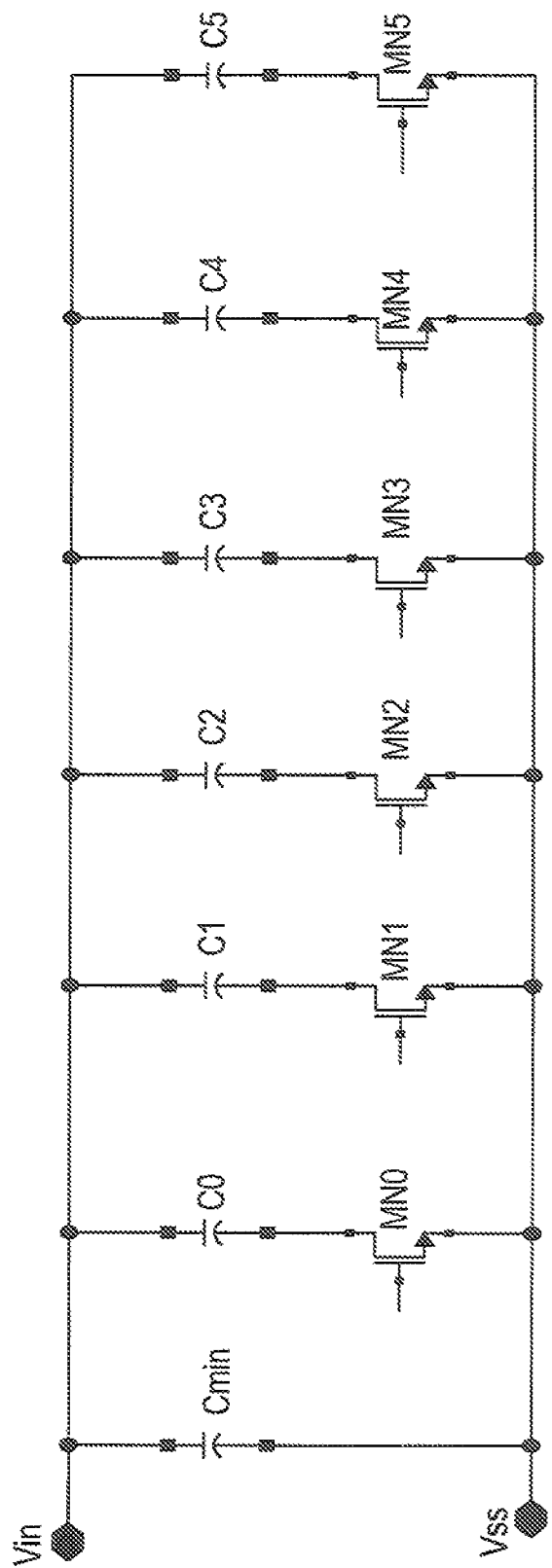
FIG. 6 shows a circuit diagram of a capacitor bank for use in embodiments of the invention.

FIG. 6 shows a circuit diagram of am example capacitor bank for use in embodiments of the invention. This type of capacitor bank will be familiar to the skilled person, and forms a selectable capacitance: it comprises a set of capacitors, some of which can be switched in and out of the circuit. In the embodiment shown, there are six capacitors, C0 through C5, with a total capacitance Cmax, which corresponds to the maximum capacitance which the capacitor bank can have. Capacitors C0 to C5, have capacitance which increase in a binary fashion, such that $C0 = 2^0 \times (Cmax - Cmin)/64$, $C1 = 2 \times (Cmax - Cmin)/64$, $C2 = 4 \times (Cmax - Cmin)/64$, and so on up to $C5 = 32 \times (Cmax - Cmin)/64$.

The capacitor C0 to C5 are switchably connectable in parallel with Cmin, by means of switches MN0-MN5, which may be MOSFETs as shown.

Figure 7:
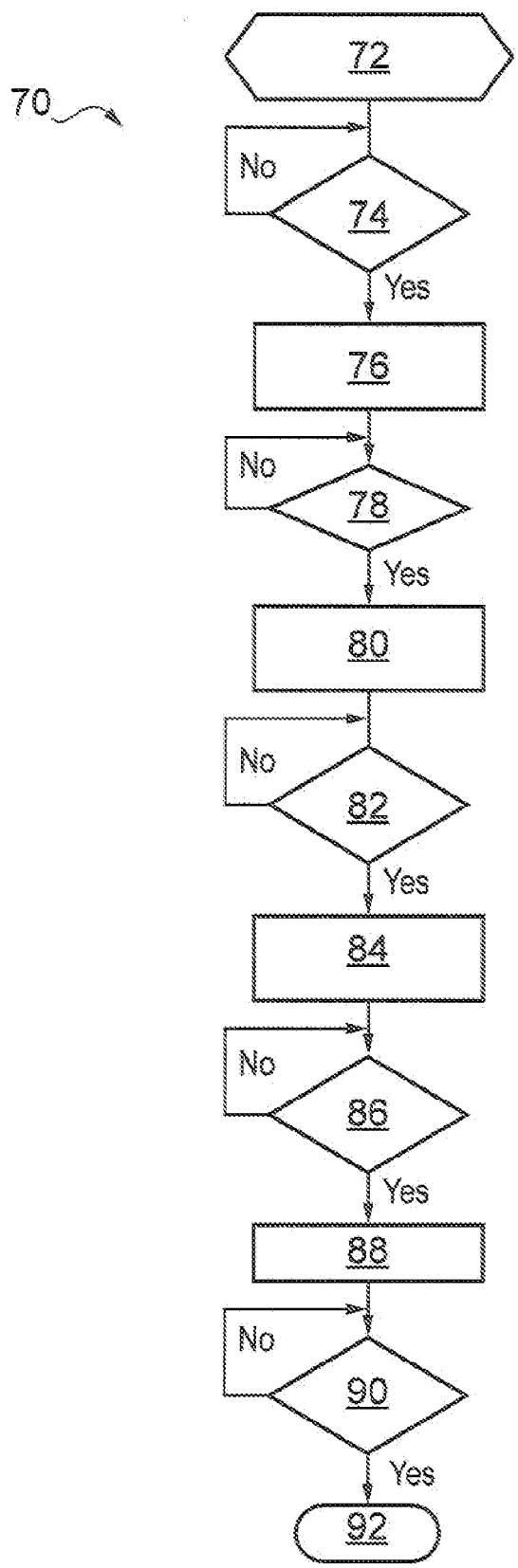
FIG. 7 shows a flow diagram of a method of operating a noncontact communication device according to embodiments of the invention.

FIG. 7 shows a flow diagram of a method of operating a non-contact communication device according to embodiments of the invention;

In an initial state 72, the communication unit is in a power-down mode, the self tuning circuit is in power-down mode, except for the LDO and the POR circuit that generates a power-on reset signal (POR) when vdda exceeds 1V; in this state the current consumption may be less than 50 nA. At decision 74, the digital control block interrogates whether vdda>1.0V: if "no" the interrogation is completed, whereas if "yes" the control moves to the next state 76. Thus at block 74, the controller will wait until the supply voltage of the tuning circuit exceeds 1V and then activates the tuning circuit. At 76, the tuning circuit is in either power-on or hold mode. Thus the oscillator, phase detector, comparator, and digital block are switched on, but the remainder of the tag functionality such as the communication unit is not switched on. The current consumption in this mode is typically thus less than 400 nA. This allows compensation for a large amount of power mismatch.

The system then waits for a predetermined number, L, of clock cycles in order to allow the analog circuits time to settle before starting the tuning process. Once L clock cycles have passed, which is determined by interrogation 78, control moves to state 80, wherein the tuning is in active mode. Tuning of the matching network as described above is then carried out. Meantime, the control interrogates at interrogation 82, whether the second power unit, for powering the communication functionality of the tag has reached a voltage greater than 1V (i.e. whether vdda_tag>1V). Once this condition is achieved, control moves to state 84, wherein the self-tuning is put into hold mode and the communication unit and other associated tag functionality is in power on mode. This allows reducing the response time of the tag to the reader request. The tag communication circuit is now powered on, but stays in the hold mode until the tuning is completed in order not to interfere with the tuning process. However, the current consumption at this stage will still typically be less than 3 µA. In the examples shown, a further M clock cycles are allowed to pass in order to allow the system to settle. This is checked by means of interrogation 86, and once this period has elapsed, control moves to state 88, in which the tuning reverts from pause mode to active mode in order to continue the self tuning. Tuning is allowed to continue until a total of N clock cycles have passed (which is checked at interrogation box 90), at which point the tuning is deemed to be completed, at box 92. At this moment the tuning circuits are forced in the power-down mode, except for the LDO which stays in the power-on mode, and the communication link between the tag and the power-providing reader can be established.

Figure 8:
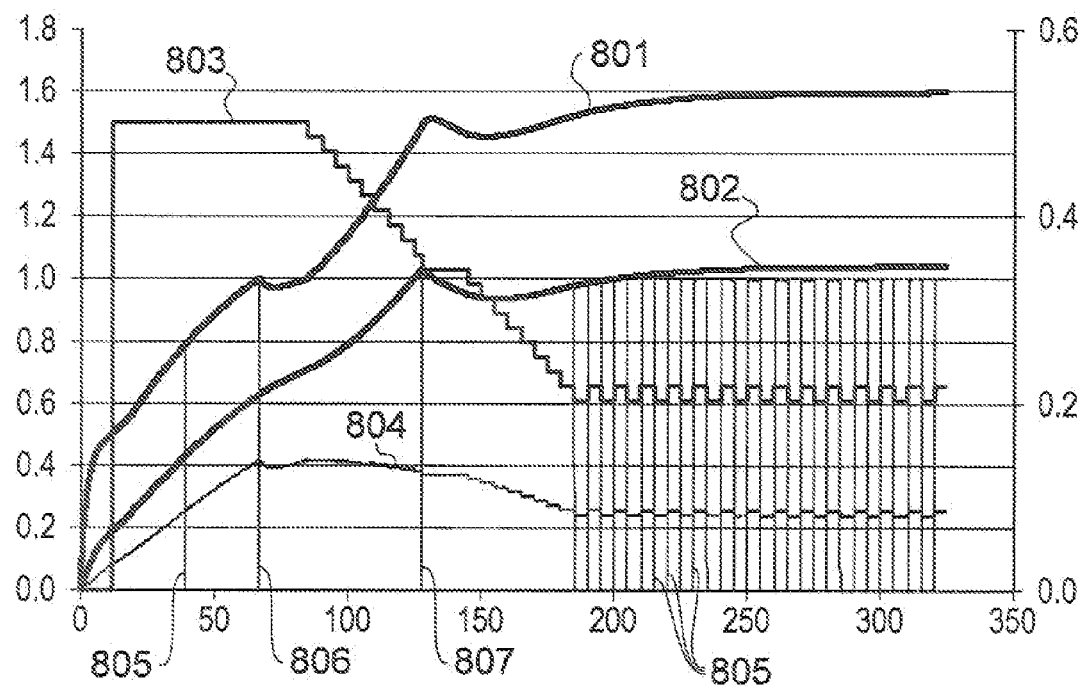
FIG. 8 shows simulation results of a situation where the antenna inductance is initially too large, and is retuned by means of a tuning circuit in accordance with embodiments of the invention.

FIG. 8 shows simulation results of a situation where the antenna inductance is initially too large, and is retuned by means of a tuning circuit in accordance with embodiments of the invention. The Figure shows several voltages (plotted in V), and the switched-in fraction of the capacitor bank, plotted against time (in µS), as follows: curve 801 is the supply voltage of the tuning circuit (vdda), and curve 802 is the main supply voltage of the tag (vdda_tag), to power for instance the communication functionality. Curve 803 is the tuning word of the capacitor bank; and curve 804 is the output of the phase detector. Transitions in the comparator output from high to low (or vice versa) are shown at 805, and the moments at which the tuning circuit, and the main power unit, are enabled are shown at moments 806 and 807 respectively.

Initially, at power-on the capacitor bank is set to 50% capacitance. At moment 806 the supply to the tuning circuit is sufficient to switch the tuning circuit on. After a relatively short settling time, the phase detector determines that the quadrature error is too high, and the counter starts to instruct the capacitor bank to reduce the tuning word 803 for the capacitance in small steps. At moment 807 the charge pump has achieved sufficient power to the switch on the main circuitry of the tag, and there is another brief settling period during which the decrementing of the capacitor word is interrupted. The increase in the capacitor bank has the effect of a reduction in the phase difference 804; once quadrature is reached, the comparator goes high, resulting in an increment in the tuning word 803 controlling the capacitance. This continual adjustment up-and-down of the phase continues until the tuning is stopped at the end of a tuning phase. The tag communication circuit switches thereafter form a hold mode, for the listen or receive mode.

Figure 9:
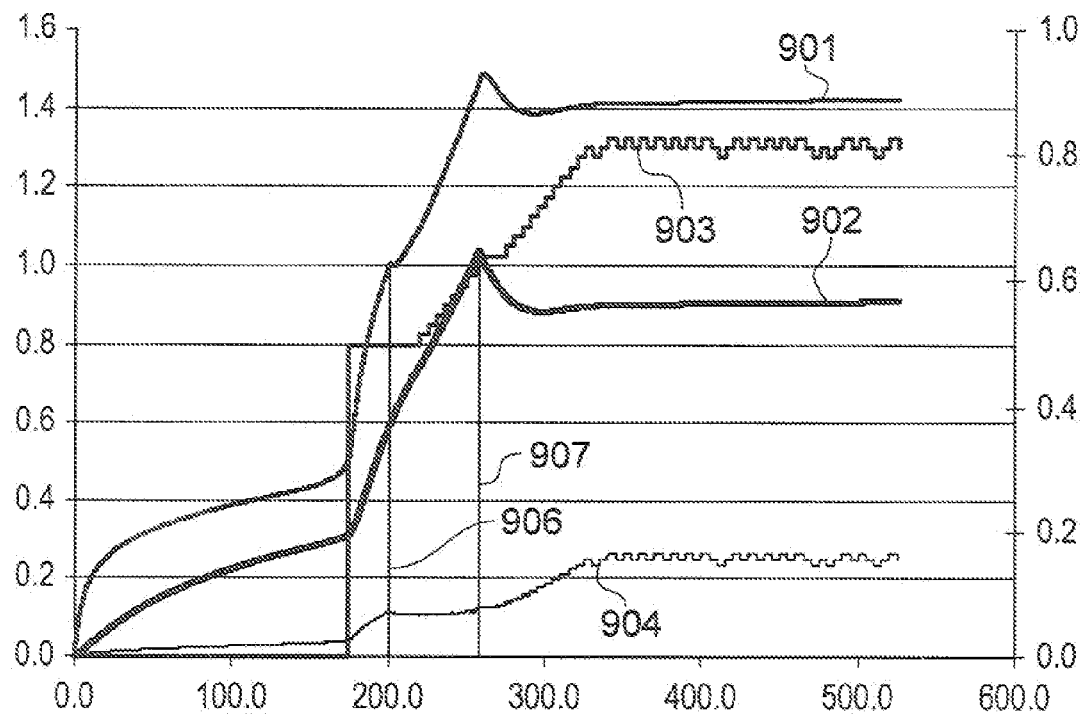
FIG. 9 shows simulation results in a situation where the antenna inductance is initially too small, and is retuned by means of a tuning circuit in accordance with embodiments of the invention.

FIG. 9 shows simulation results in a situation where the antenna inductance is initially too small, and is retuned by means of a tuning circuit in accordance with embodiments of the invention. The curves generally corresponds to those shown in FIG. 8, such that curve 901 is the supply voltage of the tuning circuit (vdda), curve 902 the main supply voltage of the tag (vdda_tag), curve 903 the tuning word of the capacitor bank, and curve 904 the output of the phase detector. The moments at which the tuning circuit, and the main power unit, are enabled are shown at moments 906 and 907 respectively.

A generally similar sequence is shown in FIG. 9 to that in FIG. 9, with the difference that in this case, initially the quadrature phase error 904 is negative, which results in the word 903 controlling the capacitance in the capacitor bank gradually increasing until quadrature is achieved. Settling periods for the system, during which there is a pause in the incrementing of the word 903, are visible after the first and second power units are switched on.

From reading the present disclosure, other variations and modifications will be apparent to the skilled person. Such variations and modifications may involve equivalent and other features which are already known in the art of non-contact communication and RFID, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A non-contact communication device comprising:
    an antenna having an antenna impedance and being configured to receive an AC signal having an input voltage and an input current,
    a main unit comprising a power-extraction unit having a charge pump and a communication unit including a main unit impedance,
    a tuning circuit, and
    a matching network for matching the antenna impedance to the main unit impedance and comprising a capacitor bank for providing a selectable capacitance,
    wherein the tuning circuit includes a passive phase detector for detecting a phase difference between the input voltage and the input current, and the passive phase detector being configured to respond to the input voltage and the input current by generating a quadrature phase error signal, the tuning circuit being configured to respond to the quadrature phase error signal by adjusting the impedance of the matching network in dependence on the phase difference so as to minimize quadrature phase error, by selecting the capacitance of the matching network.

2. A non-contact communication device as claimed in claim 1, wherein:
    the passive phase detector is configured to detect a phase difference between the input voltage and the input current by detecting the phase difference between the input voltage and a coil voltage across a matching coil, which matching coil forms part of the antenna, and
    the passive phase detector includes a plurality of mixers for providing the quadrature phase error signal based on the input voltage and the input current.

3. A non-contact communication device as claimed in claim 1, wherein the power-extraction unit comprises a first output for providing power to the tuning circuit and a second output for providing power to the communication unit.

4. A non-contact communication device as claimed in claim 3 wherein the first power output has at least one or more stages and a smaller time constant than the second power output.

5. A non-contact communication device as claimed in claim 1, wherein the tuning circuit further comprises a quantiser for quantising an output of the passive phase detector and for providing an input to a counter, which counter is configured to select the capacitance of the matching network.

6. A method of operating a non-contact communication device, the method comprising:
    receiving an AC signal at an antenna;
    extracting power from the AC signal using a power-extraction unit having a charge pump; and
    using at least a part of the extracted power to tune the device by:
        detecting a phase difference between a voltage and a current of the AC signal in a passive phase detector, and
        responding to the AC signal by generating a quadrature phase error signal and responding to the quadrature phase error signal by adjusting a matching network, so as to minimise quadrature phase error, in dependence on the phase by selecting a capacitance of the matching network.

7. The method of claim 6 wherein adjusting the matching network in dependence on the phase comprises
    quantising an output of the passive phase detector,
    adjusting a counter in response to the quantisation, and
    selecting the capacitance of a capacitor bank in dependence on the counter.

8. The method of claim 6, further comprising, subsequent to tuning the device, using a further part of the extracted power to power a communication unit.

9. The method of claim 6, further including comparing the quadrature phase error signal to a reference signal and, in response, providing a correction signal.

10. The method of claim 7, further including comparing the quadrature phase error signal to a reference signal and, in response, providing a correction signal, and wherein selecting the capacitance of the matching network is performed in response to the correction signal by sending an increment signal or decrement signal for selecting the capacitance.

11. A non-contact communication device as claimed in claim 1, further including a comparison circuit configured and arranged to respond to the passive phase detector by comparing the quadrature phase error signal to a reference signal and, in response, providing a correction signal.

12. A non-contact communication device as claimed in claim 1, further including a comparison circuit and logic circuitry, the comparison circuit being configured and arranged to respond to the passive phase detector by comparing the quadrature phase error signal to a reference signal and, in response, providing a correction signal, and the logic circuitry being configured and arranged to respond to the correction signal.

13. A non-contact communication device as claimed in claim 12, further including a counter circuit which responds to the correction signal by sending an increment signal or decrement signal for selecting the capacitance.

14. A non-contact communication device as claimed in claim 13, wherein the increment signal or decrement signal is received and processed by the capacitor bank by changing the capacitance.

15. A non-contact communication device as claimed in claim 1, further including a comparison circuit and logic circuitry, the comparison circuit being configured and arranged to respond to the passive phase detector by comparing the quadrature phase error signal to a reference signal and, in response, providing a correction signal, and the logic circuitry being configured and arranged to select the capacitance in response to the correction signal.

16. A non-contact communication device as claimed in claim 15, further including a counter circuit which responds to the correction signal by sending an increment signal or decrement signal for selecting the capacitance.

17. A non-contact communication device as claimed in claim 16, wherein the increment signal or decrement signal is received and processed by the capacitor bank by changing the capacitance.

18. A non-contact communication device as claimed in claim 1, wherein the tuning circuit further includes
a counter circuit,
a digital control circuit,
a comparator circuit configured and arranged to receive the quadrature phase error signal, compare the quadrature phase error signal to a reference value, and output the comparison to a counter circuit,
the digital control circuit being configured and arranged to set the capacitance of the matching network based on the output of the comparison.

19. A non-contact communication device as claimed in claim 1, wherein the tuning circuit further includes
a capacitor bank, including a plurality of capacitors, configured and arranged to provide an adjustable range of capacitance, and
a digital control block configured and arranged to
receive an analog signal indicative of the quadrature phase error signal,
select the capacitance of the capacitor bank based on the received analog signal, and
transmit data indicative of the selected capacitance to the capacitor bank,
the capacitor bank being responsive to the data by controlling the coupling of the plurality of capacitors based on the selected capacitance value.

* * * * *